(12) United States Patent
Winkler et al.

(10) Patent No.: US 7,111,855 B2
(45) Date of Patent: Sep. 26, 2006

(54) LINK ADJUSTMENT MECHANISM

(75) Inventors: Bernhard Winkler, West Bloomfield, MI (US); Raymond H Tilly, Rochester Hills, MI (US); Awad Ramouni, Dearborn, MI (US); John F Santori, Shelby Township, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 350 days.

(21) Appl. No.: 10/740,202

(22) Filed: Dec. 18, 2003

(65) Prior Publication Data

US 2005/0062248 A1    Mar. 24, 2005

Related U.S. Application Data

(60) Provisional application No. 60/504,757, filed on Sep. 22, 2003.

(51) Int. Cl.
*B62D 17/00*   (2006.01)

(52) U.S. Cl. .............. 280/86.754; 280/86.758

(58) Field of Classification Search .......... 280/86.758, 280/86.757, 86.75, 86.751, 86.753, 86.754, 280/86.755
See application file for complete search history.

(56) References Cited

U.S. PATENT DOCUMENTS

| | | | | |
|---|---|---|---|---|
| 4,267,896 A | * | 5/1981 | Hendriksen | 280/86.75 |
| 4,424,984 A | * | 1/1984 | Shiratori et al. | 280/86.753 |
| 5,052,711 A | * | 10/1991 | Pirkey et al. | 280/86.753 |
| 5,779,260 A | * | 7/1998 | Reilly et al. | 280/86.754 |
| 6,027,129 A | * | 2/2000 | Kleinschmit et al. | 280/86.754 |
| 6,409,189 B1 | * | 6/2002 | Orimoto et al. | 280/86.751 |
| 6,688,616 B1 | * | 2/2004 | Ziech | 280/86.751 |
| 6,908,254 B1 | * | 6/2005 | Atwater et al. | 403/350 |

\* cited by examiner

*Primary Examiner*—Paul N. Dickson
*Assistant Examiner*—Drew J. Brown
(74) *Attorney, Agent, or Firm*—Ralph E. Smith

(57) ABSTRACT

A toe link assembly of a suspension system includes a cam sleeve having a first and second end, a first cam plate fixedly attached to the cam sleeve at the first end, and a second cam plate fixedly attached to the cam sleeve at the second end. In addition, the toe link assembly includes a first cam washer rotatably received by the first cam plate, a second cam washer rotatably received by the second cam plate, and a bolt having a head fixedly attached to the first cam washer, a body extending between the first and second ends of the cam sleeve, and a shank fixed for rotation with the second cam washer. Rotation of the bolt causes the first and second cam washers to react against the first and second cam plates to position the bolt relative to the cam sleeve along a first longitudinal axis.

20 Claims, 6 Drawing Sheets

LINK ADJUSTMENT MECHANISM

This application claims the benefit of U.S. Provisional Application Ser. No. 60/504,757, filed Sep. 22, 2003.

FIELD OF THE INVENTION

The present invention relates to suspension assemblies, and more particularly, to alignment adjustments for use in a vehicle suspension system.

BACKGROUND OF THE INVENTION

Conventional independent suspension systems include a plurality of linkages and knuckles supported by a subframe of a vehicle, each knuckle being responsible for rotatably supporting a vehicle wheel and each linkage being responsible for interconnecting each knuckle to the subframe. Each link is generally responsible for the control, steering, and positioning of a knuckle, and thus, the positioning of a vehicle wheel. The wheels are aligned with an adjustment system, which is built into the suspension system.

Conventional adjustment systems are cumbersome and complicated to implement. Furthermore, conventional adjustment systems commonly require many parts, thereby increasing the weight, cost, and complexity of the suspension system.

Therefore, a link assembly, which provides for quick adjustment of a link relative to a suspension system, is desirable in the industry. Additionally, a link assembly utilizing a minimal number of parts, while concurrently providing for adequate positioning of a link relative to a suspension system, is also desirable in the industry.

SUMMARY OF THE INVENTION

Accordingly, the present invention provides a link assembly of a suspension system including a cam sleeve having a first end and a second end, a first cam plate fixedly attached to the cam sleeve at the first end, and a second cam plate fixedly attached to the cam sleeve at the second end. In addition, the toe link assembly includes a first cam washer rotatably received by the first cam plate, a second cam washer rotatably received by the second cam plate, and a bolt having a bolt head fixedly attached to the first cam washer, an elongate body extending between the first and second ends of the cam sleeve, and a shank portion fixed for rotation with the second cam washer. Rotation of the bolt causes the first and second cam washers to react against the first and second cam plates to position the bolt relative to the cam sleeve along a first longitudinal axis.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

With reference to the figures, a link assembly 10 includes a cam assembly 12, a link 14, and a bolt 16. The bolt 16 operably supports the link 14 from the cam assembly 12. The cam assembly 12 is operable to adjust the position of the link 14 through adjustment of the bolt 16, as will be discussed further below.

Figure 3:
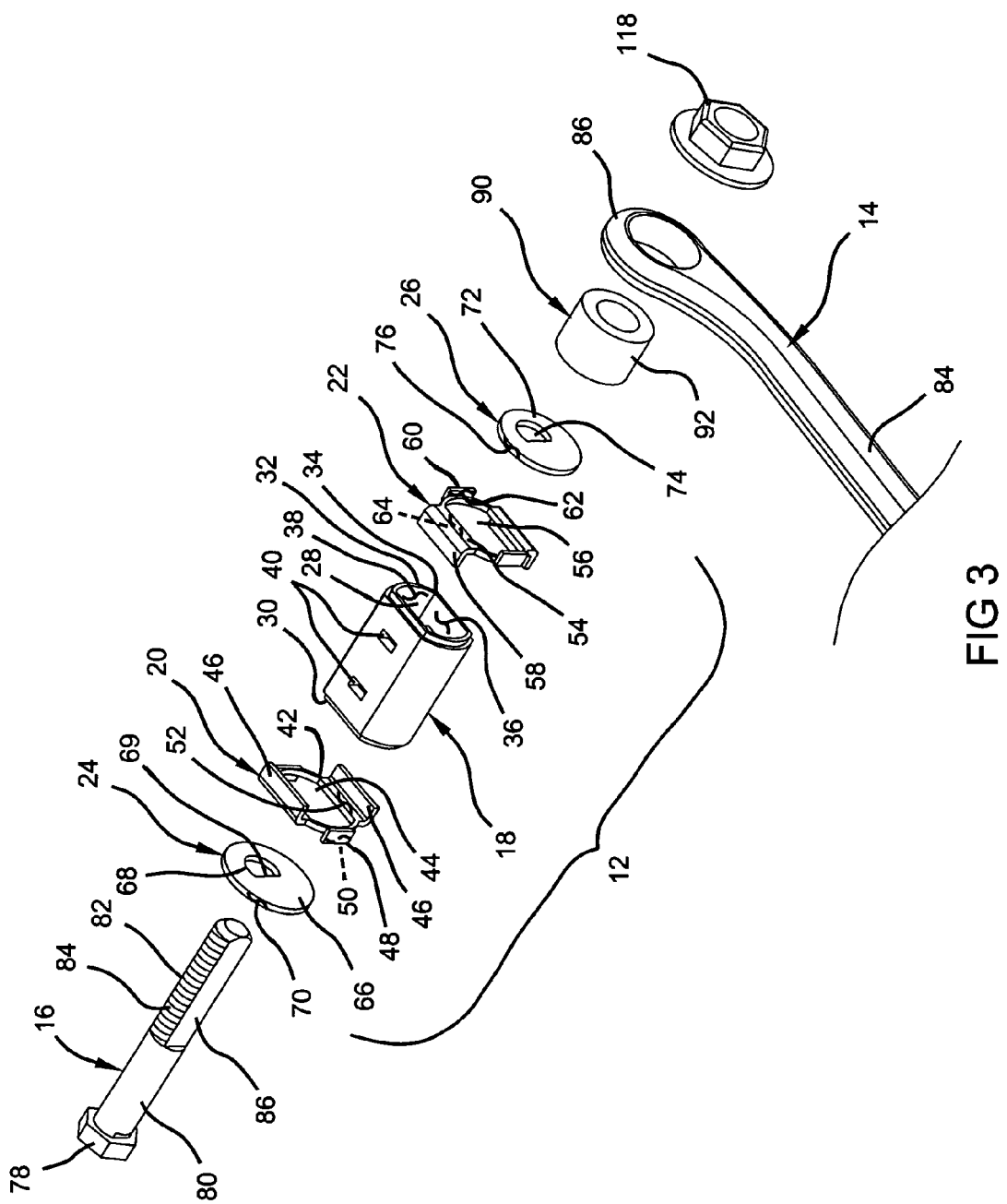
FIG. 3 is an exploded view of the toe link assembly of FIG. 2.
Figure 5:
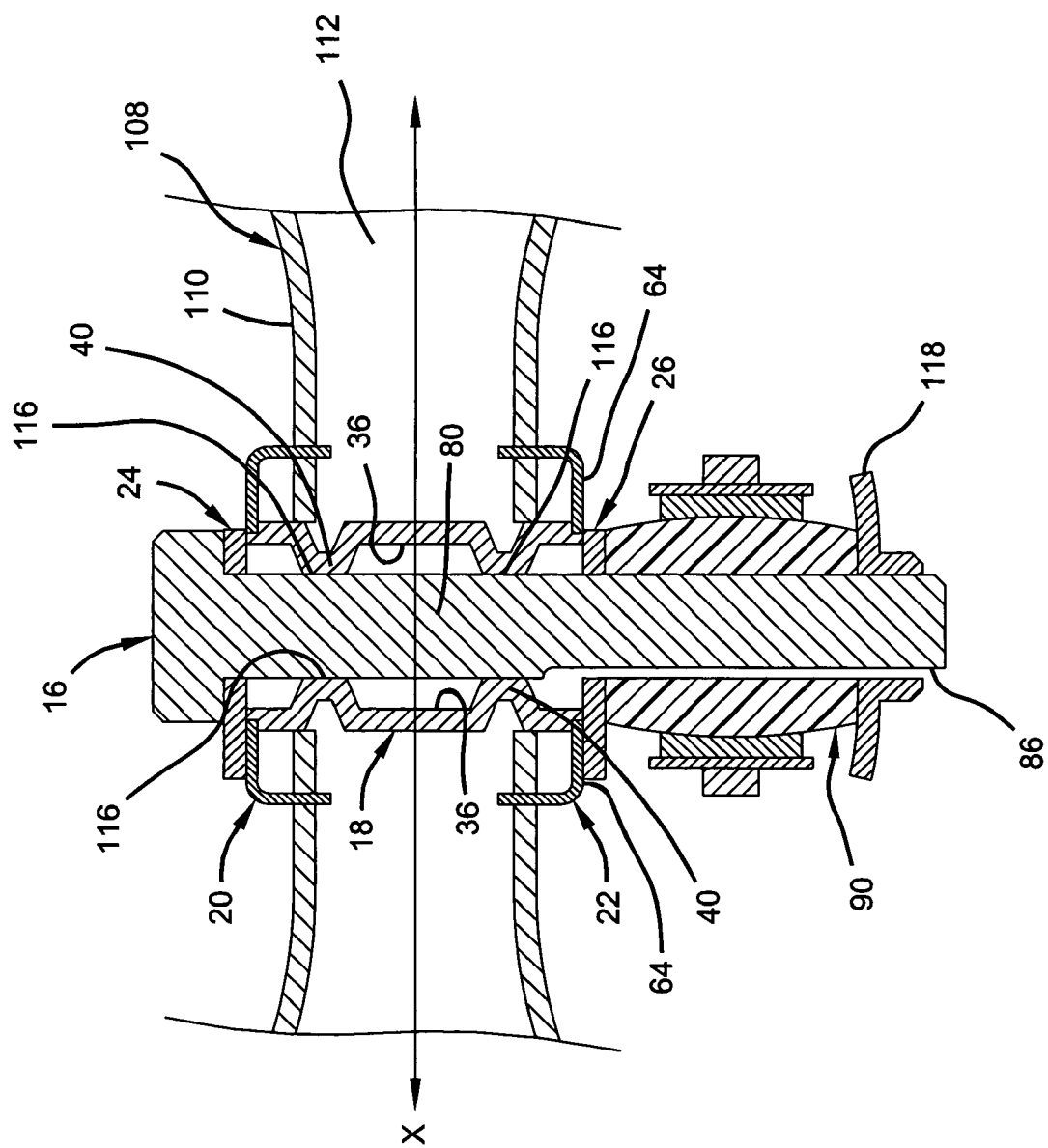
FIG. 5 is a sectional view of the toe link assembly of FIG. 2 incorporated into a subframe taken along line B—B of FIG. 2.

The cam assembly 12 includes a cam sleeve 18, a first cam plate 20, a second cam plate 22, a first cam washer 24, and a second cam washer 26. The cam sleeve 18 fixedly supports the first and second cam plates 20, 22 and includes a bore 28 extending between first and second ends 30, 32 of the cam sleeve 18. The bore 28 forms an interior surface 34 having two planar surfaces 36 and two arcuate surfaces 38, as best shown in FIG. 3. The planar surfaces 36 include a plurality of projections 40 integrally formed thereon. More particularly, the projections 40 are formed in the interior surface 34 by a suitable manufacturing process such as, but not limited to, punching or stamping such that the projections 40 extend into the bore 28, as best shown in FIG. 5.

The first cam plate 20 is fixedly attached to the first end 30 of the cam sleeve 18 and includes a main body 42, a central aperture 44, a first pair of tabs 46, and a second pair of tabs 48. The central aperture 44 is positioned adjacent the first end 30 of the cam sleeve 18 and generally provides an opening to bore 28. The first tabs 46 extend from the cylindrical body 42 for use in attaching the first cam plate 20 to the cam sleeve 18. The second tabs 48 extend in an opposite direction from the cylindrical body 42 from that of the first tabs 46 and include a reaction surface 50. The reaction surfaces 50 are formed generally perpendicular to a top surface 52 of the cylindrical body 42 and are operable to engage the first cam washer 24, as will be discussed further below.

The second cam plate 22 is fixedly attached to the second end 32 of the cam sleeve and includes a main body 54, a central aperture 56, a first pair of tabs 58, and a second pair of tabs 60. The central aperture 56 is positioned adjacent the second end 32 of the cam sleeve 18 and generally provides an opening to bore 28. The first tabs 58 extend from the cylindrical body 54 for use in attaching the second cam plate 22 to the cam sleeve 18. The second tabs 60 extend in an opposite direction from the cylindrical body 54 from that of the first tabs 58 and include a reaction surface 62. The reaction surfaces 62 are formed generally perpendicular to a top surface 64 of the cylindrical body 54 and are operable to engage the second cam washer 26, as will be discussed further below.

Figure 4:
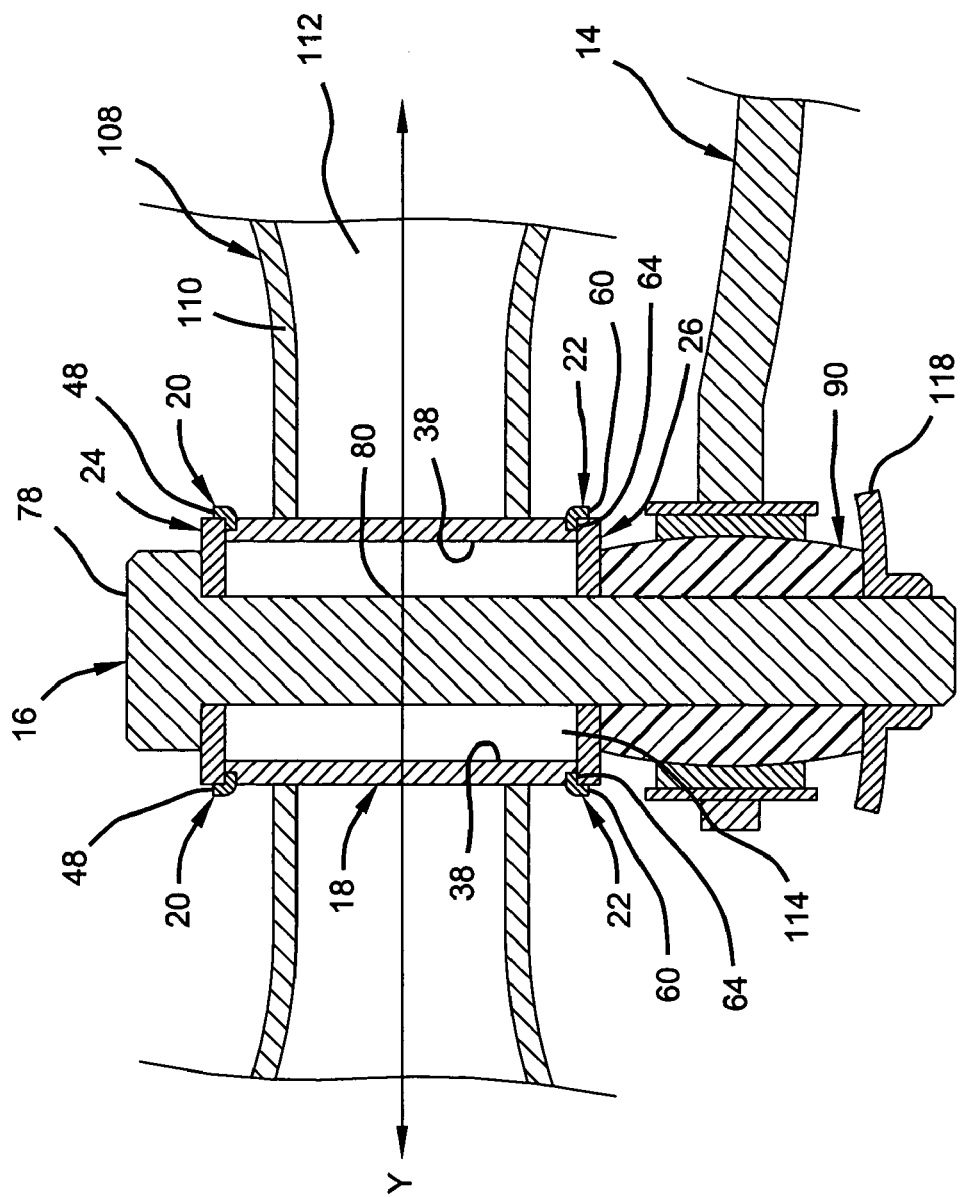
FIG. 4 is a sectional view of the toe link assembly of FIG. 2 incorporated into a subframe taken along line A—A of FIG. 2.

The first cam washer 24 is rotatably received by the first cam plate 20 and includes a generally circular body 66, an aperture 68, and a reaction surface 70 extending around a perimeter of the circular body 66. The aperture 68 is formed through the body 66 and is eccentric to an axis of rotation of the circular body 66, as best shown in FIG. 3. The aperture 68 is generally circular but may include a flat 69 for mating engagement with the bolt 16, as will be discussed further below. The reaction surface 70 operably engages the reaction surfaces 50 of the first cam plate 20 such that as the first cam washer 24 rotates, the second tabs 48 restrict lateral movement of the washer 24. In this regard, the washer 24 is effectively retained between the top surface 52 and second tabs 48 of the first cam plate 20, as best shown in FIGS. 4 and 5.

The second cam washer 26 is rotatably received by the second cam plate 22 and includes a generally circular body 72, an aperture 74, and a reaction surface 76 extending around a perimeter of the circular body 72. The aperture 74 is formed through the body 72 and is eccentric to an axis of rotation of the circular body 72, as best shown in FIG. 3. The aperture 74 is matingly received by the bolt 16, as will be discussed further below. The reaction surface 76 operably engages the reaction surfaces 62 of the second cam plate 22 such that as the second cam washer 26 rotates, the second tabs 60 restrict lateral movement of the washer 26. In this regard, the washer 26 is effectively retained between the top surface 64 and second tabs 60 of the second cam plate 22, as best shown in FIGS. 4 and 5.

Figure 6:
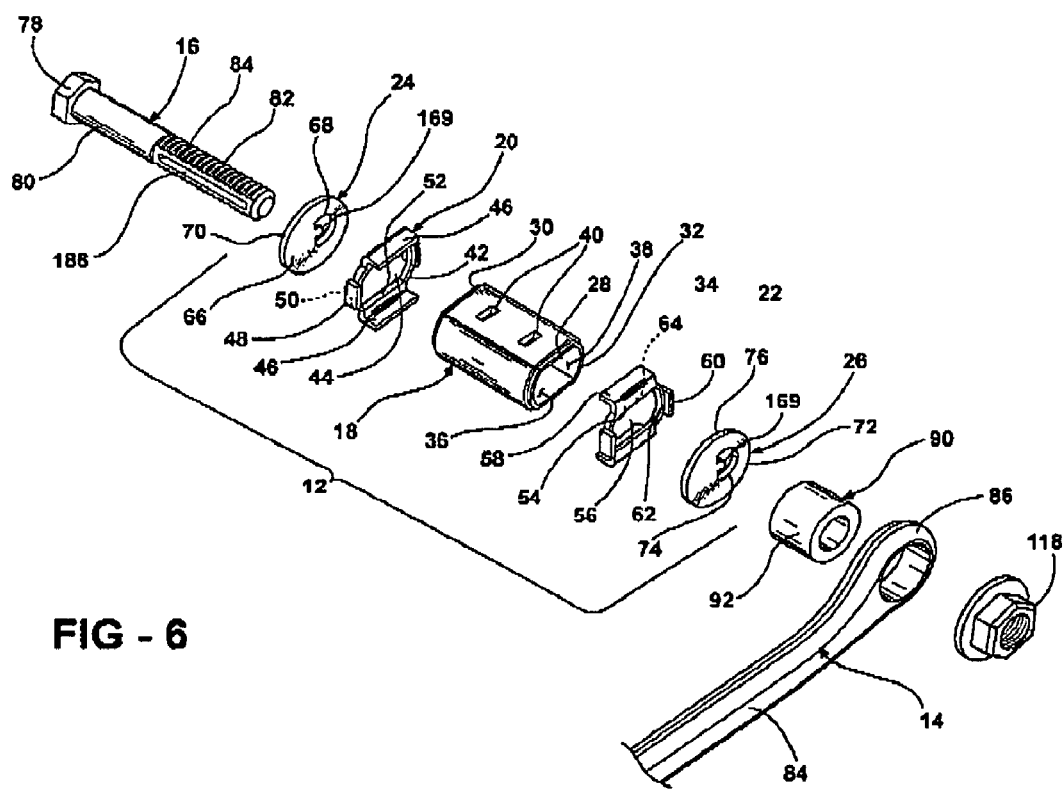
FIG. 6 is an exploded view of the toe link assembly of FIG. 2 according to an alternate exemplary embodiment.

The bolt 16 includes a head 78, a cylindrical portion 80 extending from the bead 78, and a threaded portion 82 extending from the cylindrical portion 80. In one embodiment, the threaded portion 82 includes an arcuate region 84 and a flat 86, as best shown in FIG. 3. The flat 86 is operable to engage aperture 74 of the second cam washer 26 such that the second cam washer 26 rotates with the bolt 16. While a flat 86 is disclosed, it should be understood that any suitable arrangement for locking the second cam washer 26 to the bolt 16, such as the arrangement shown in FIG. 6 showing a key 169 and slot 186 design, is anticipated and should be considered within the scope of the present invention.

Figure 1:
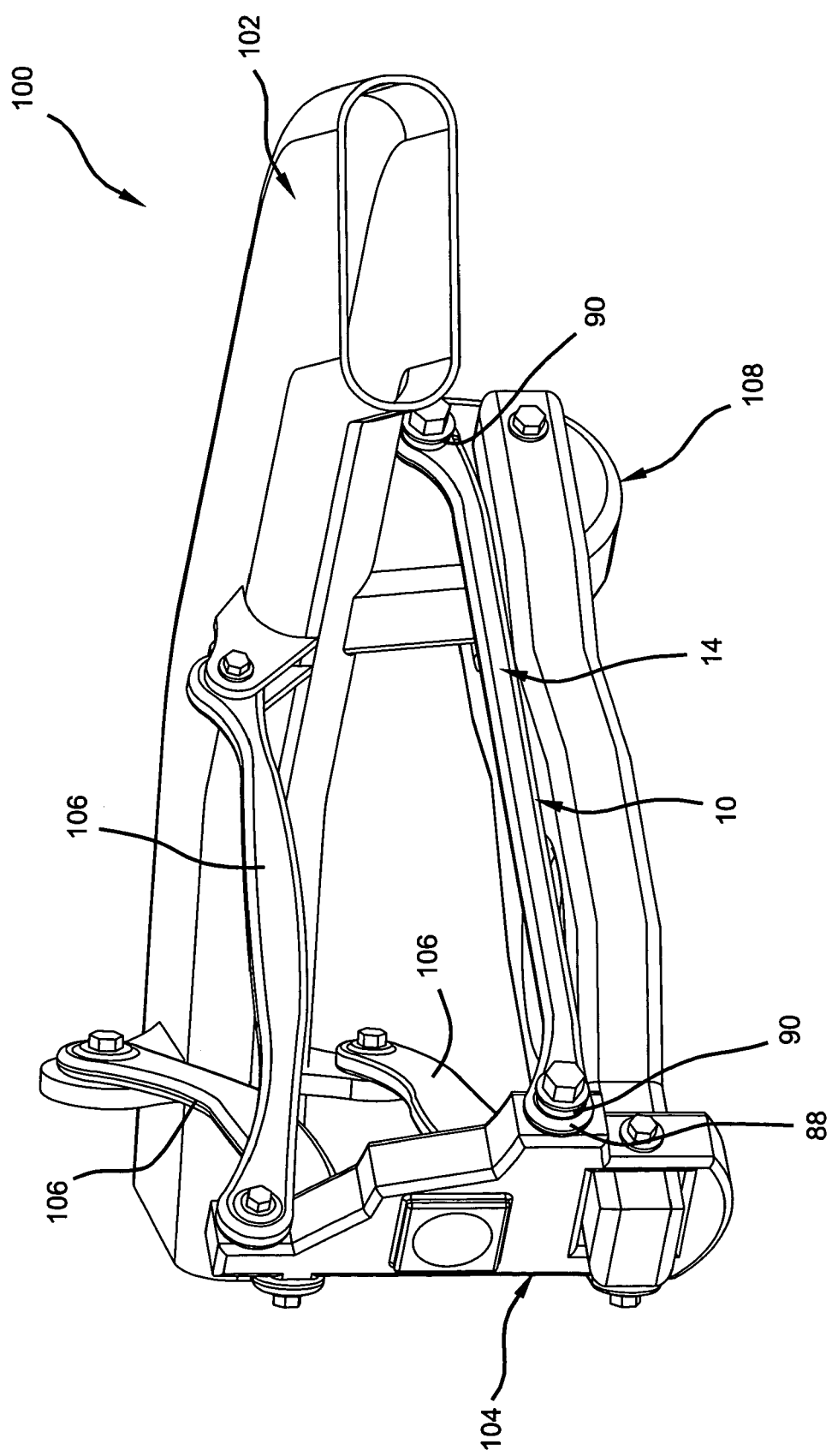
FIG. 1 is a perspective view of a suspension system incorporating a toe link assembly in accordance with the principals of the present invention.
Figure 2:
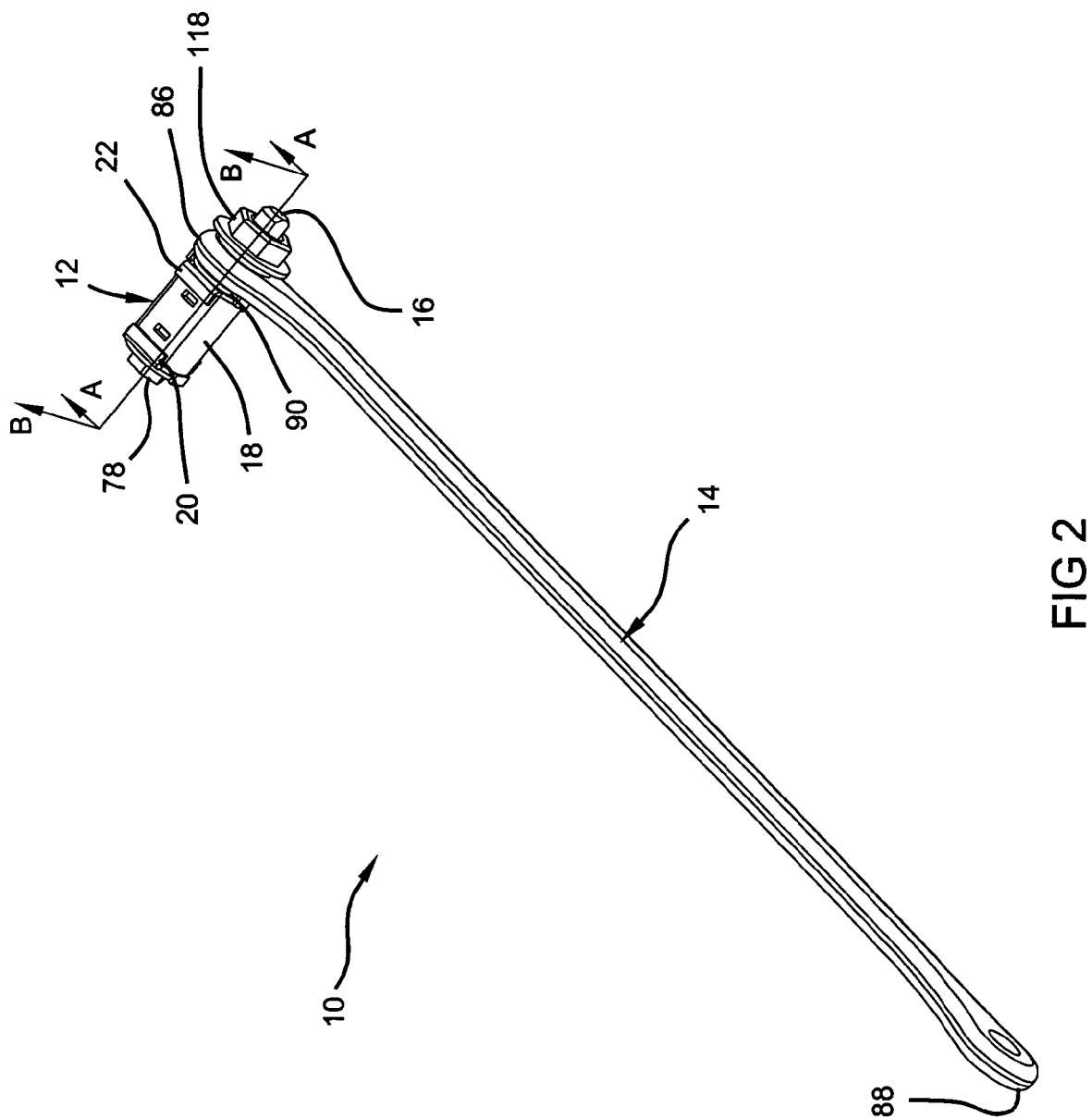
FIG. 2 is a perspective view of the toe link assembly of FIG. 1.

The link 14 is an elongate beam having a main body 84, a first end 86, a second end 88, and a bushing 90. The bushing 90 includes a cylindrical body 92 and is fixedly attached to the first end 86 of the link 14. The bushing 90 is matingly received by the bolt 16 such that the link 14 is operably connected to the cam assembly 12, as will be discussed further below. The second end 88 of the link 14 similarly includes a bushing 90 for attachment to a suspension system 100, as best shown in FIG. 1. According to the present exemplary embodiment, the link assembly 10 is a toe link assembly, and the link 14 is a toe link.

With reference to FIGS. 1–5, the operation of the link assembly 10 will be described in detail. The link assembly 10 is operably connected to a suspension system 100, as best shown in FIG. 1. The suspension system 100 includes a subframe 102 operably supporting a knuckle 104 and a plurality of control links 106. In addition, the suspension system 100 includes a cross-member 108 extending from, and integrally formed with, the subframe 102 for interaction with the link assembly 10, as will be discussed further below. The cross-member 108 is formed from a suitable process such as welding, stamping, or hydroforming and includes an outer wall 110 forming an interstitial space 112 for receiving the cam assembly 12, as best shown in FIGS. 4 and 5.

The cam assembly 12 is received by the cross-member 108 and generally dictates the relative position of the link 14 and subframe 102. Specifically, the cam sleeve 18 of the cam assembly 12 is received by the cross-member 108 through the interstitial space 112 and is fixedly attached to the walls 110 of the cross-member 108 by a suitable method such as welding and the like. In this manner, the cam sleeve 18 essentially creates an opening 114 extending across the cross-member 108 between the first and second ends 30, 32 of the cam sleeve 18 for receipt of the bolt 16, as will be discussed further below. As can be appreciated, the proper positioning of the opening 114 relative to the cross-member walls 110 plays a significant role in properly positioning the link 14 relative to the subframe 102.

To account for a manufacturing deviation either in the forming or assembly of the cross-member 108 and cam sleeve 18, a broach (not shown) is used to grind the projections 40 and create a planar surface 116 on each projection 40 once the cam sleeve 18 is fixed to the cross-member 108. The planar surfaces 116 serve to properly position the opening 114 relative to the subframe 102, thereby accounting for any manufacturing deviation between the subframe 102 and cam sleeve 18. While the broaching operation may not re-position the cam sleeve 18 relative to the subframe 102, the operation is successful in positioning the link 14 relative to the subframe 102 as the planar surfaces 116 effectively position the bolt 16, as will be discussed further below.

Once the planar surfaces 116 are formed on the projections 40, the first and second cam plates 20, 22 may be fixedly attached to the respective ends of the cam sleeve 18 through a suitable process such as, but not limited to, welding and the like. As previously discussed, each of the first and second cam plates 20, 22 include a central aperture 44, 56. The first and second apertures 44, 56 are co-axially aligned such that the apertures 44, 56 are aligned with an opening formed between the planar surfaces 116 of the projections 40 within the aperture 28 of the cam sleeve 18. In this regard, the apertures 44, 56 and planar surfaces 116 form a passageway for receiving the bolt 16, as best shown in FIGS. 4 and 5.

Prior to assembling the bolt 16 to the cam sleeve 18, the first cam washer 24 is staked to the cylindrical portion 80 of the bolt 16, proximate the head 78. Once staked, the bolt 16 is inserted through aperture 44 of the first cam plate 20 and then through aperture 56 of the second cam plate 22 such that the first cam washer 24 is rotatably received between tabs 48. It should be noted that the cylindrical portion 80 of the bolt 16 is rotatably supported by the planar surface 116 of the projections 40 within the cam sleeve 18. In this manner, the planar surfaces 116 properly align the bolt 16 relative to the sleeve 18 and further serve to restrict movement in a first direction labeled as "X" in FIG. 5 while concurrently permitting movement of the bolt 16 within the sleeve in a second direction labeled "Y" in FIG. 4.

Movement of the bolt 16 in the Y direction is accomplished through rotation of first and second cam washers 24, 26 relative to the first and second cam plates 20, 22 to position the bolt 16 relative to the cam sleeve 18. Specifically, as the apertures 68, 74 are formed eccentric to an axis of rotation of the first and second cam washers 24, 26, rotation of the washers 24, 26 relative to the first and second cam plates 20, 22 causes lateral movement of the bolt 16 relative to the cam sleeve 18 in the Y direction, as will be discussed further below.

Once the bolt 16 has been inserted into the second cam plate 22, the threaded portion 82 extends from the top surface 64, as best shown in FIGS. 4 and 5. In one embodiment, the threaded portion 82 includes the flat 86 extending from the top surface 64. The flat 86 is matingly received by aperture 74 of the second cam washer 26. In this manner, the flat 86 serves to position the second cam washer 26 relative to the bolt 16 in an effort to align the first and second cam washers 24, 26. While a flat 86 is disclosed, it should be understood that any configuration which properly aligns the first and second cam washers 24, 26 for rotation with the bolt 16, such as a key, is anticipated and should be considered within the scope of the present invention.

The link 14 is assembled to the threaded portion 82 of the bolt 16 generally at the first end 86. More particularly, the bushing 90 is matingly received by the bolt 16 and is operable to attach the first end 86 to the threaded portion 82. Once the bushing 90 and link 14 are assembled over the threaded portion 82 of the bolt 16, a suitable nut 118 engages the bolt 16 to hold the bushing 90 and link 14 proximate the second cam washer 26. At this point, the link 14 is proximate the second cam washer 26 and is loosely held thereto by the nut 118.

Prior to fixedly attaching the link 14 to the bolt 16 by tightening the nut 118, the link 14 must first be properly aligned to the subframe 102 so as to ensure that the knuckle 104 may also be properly positioned relative thereto. To properly position the link 14, the bolt 16 is rotated such that the first and second cam washers 24, 26 react against the respective tabs 48, 60 of the first and second cam plates 20, 22. Such reaction causes the bolt 26 to traverse along the planar surfaces 116 along the Y direction of FIG. 4 due to the eccentric relationship between apertures 68, 74 and the axis of rotation of the first and second cam washers 24, 26, respectively. Such movement of the bolt 16 causes the position of the link 14 relative to the subframe 102 and cam sleeve 18 to be concurrently adjusted. Once the position of the link 14 is proper, the nut 118 is tightened and the link 14 is fixed to knuckle 104 at the second end 88.

Such adjustment of the link 14 relative to the subframe 102, provides the suspension system 100 with flexibility, thereby providing manufacturers with the ability to ensure proper tire alignment through positioning of the knuckle 104 relative to the subframe 102.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus comprising:
   a cam sleeve having a first end and a second end and a plurality of projections on an inner surface of said cam sleeve;
   a first cam plate fixedly attached to said cam sleeve at said first end;
   a second cam plate fixedly attached to said cam sleeve at said second end;
   a first cam washer rotatably received by said first cam plate;
   a second cam washer rotatably received by said second cam plate; and
   a bolt having a bolt head fixedly attached to said first cam washer, an elongate body extending between said first and second ends of said cam sleeve, and a shank portion fixed for rotation with said second cam washer;
   wherein rotation of said bolt causes said first and second cam washers to react against said first and second cam plates to position said bolt relative to said cam sleeve along a first axis generally perpendicular to a longitudinal axis of said bolt.

2. The apparatus of claim 1 wherein said first cam washer includes a first aperture formed eccentric from an axis of rotation of said first cam washer, said first aperture matingly received by said elongate body of said bolt and fixedly attached thereto.

3. The apparatus of claim 1 wherein said second cain washer includes a second aperture formed eccentric from an axis of rotation of said second cam washer, said second aperture matingly received by said shank portion of said bolt.

4. The apparatus of claim 3 wherein said shank portion includes a keyed pardon, said keyed portion matingly received by said second aperture such that said second cam washer is fixed for rotation with said bolt.

5. The apparatus of claim 3 wherein said shank portion includes a flat, said flat matingly received by said second aperture such that said second cam washer is fixed for rotation with said bolt.

6. The apparatus of claim 1 wherein said first cam plate includes a first pair of reaction arms, said first reaction arms engaging an outer surface of said first cam washer to restrict lateral movement of said first cam washer while concurrently permitting rotation of said first cam washer relative to said first cam plate.

7. The apparatus of claim 1 wherein said second cain plate includes a second pair of reaction arms, said second reaction arms engaging an outer surface of said second cam washer to restrict lateral movement of said second cam washer while concurrently permitting rotation of said second cam washer relative to said second cam plate.

8. An apparatus comprising:
   a cam sleeve having a first end and a second end;
   a first cam plate fixedly attached to said cam sleeve at said first end;
   a second cam plate fixedly attached to said cain sleeve at said second end;
   a first cam washer rotatably received by said first cam plate;
   a second cam washer rotatably received by said second cam plate; and
   a bolt having a bolt head fixedly attached to said first cam washer, an elongate body extending between said first and second ends of said cam sleeve, and a shank portion fixed for rotation with said second cam washer;
   wherein rotation of said bolt causes said first and second cam washers to react against said first and second cain plates to position said bolt relative to said cam sleeve along a first axis generally perpendicular to a longitudinal axis of said bolt;
   wherein said cam sleeve further includes a plurality of projections formed on an inner wall thereof, said projections operable to engage said elongate body of said bolt and restrict movement of said bolt along a second axis, said second axis being generally perpendicular to said longitudinal axis of said bolt and offset substantially 90° from said first axis.

9. The apparatus of claim 8 wherein said elongate body of said bolt includes a generally cylindrical shape, said cylindrical shape abutting said projections to restrict movement of said bolt along said second longitudinal axis.

10. The apparatus of claim 8 wherein said shank portion of said bolt extends through said second cam plate generally away from said cam sleeve.

11. The apparatus of claim 10 wherein said shank portion matingly receives a bushing, said bushing operable to matingly receive a toe link.

12. The apparatus of claim 11 wherein said shank includes a plurality of threads, said plurality of threads operable to matingly receive a nut to retain said bushing and toe link on the apparatus.

13. The apparatus of claim 11 wherein said toe link is adapted to be connected to a suspension system, said toe link adapted to be adjusted relative to said suspension system through movement of said bolt relative to said cam sleeve.

14. The apparatus of claim 13 wherein said cam sleeve is adapted to be fixedly attached to said suspension system.

15. A method for adjusting a suspension system comprising:
   forming a cam sleeve having a first and second end and a plurality of projections on an inner surface of said cam sleeve;
   fixedly attaching said cam sleeve to an external structure;
   broaching said projections to provide a predetermined opening between said projections positioned in a predetermined location relative said external structure;
   fixedly attaching a first cam plate to said first end of said cam sleeve and a second cam plate to said second end of said cam sleeve;
   providing a first cam washer rotatably supported by said first cam plate, said first cam washer including a first aperture formed eccentrically from an axis of rotation of said first cam washer;
   providing a second cam washer rotatably supported by said second cam plate, said second cam washer including a second aperture formed eccentrically from an axis of rotation of said second cam washer;
   fixing said first cam washer for rotation with said bolt;
   inserting said bolt through said first and second cam plates;
   inserting said bolt through said second cam washer and fixing said second cam washer for rotation with said bolt;
   rotating said bolt and said first and second cam washers relative to said first and second cam plates to position said bolt relative said cam sleeve and said external structure.

16. The method of adjusting a suspension system of claim 15 wherein said external structure is a suspension system.

17. The method of adjusting a suspension system of claim 15 further comprising the step of positioning said bolt adjacent said plurality of projections.

18. The method of adjusting a suspension system of claim 15 further comprising the step of loosely attaching a toe link to said bolt proximate said second cam washer and securing a fastener to an end of said bolt to retain said toe link.

19. The method of adjusting a suspension system of claim 18 further comprising the step of rotating said bolt to position said toe link relative said external structure to position said toe link in a desired position relative thereto.

20. The method of adjusting a suspension system of claim 19 further comprising the step of tightening said fastener to fixedly hold said toe link in said desired position relative said external structure.

* * * * *